United States Patent
Ding et al.

(10) Patent No.: US 10,268,018 B1
(45) Date of Patent: Apr. 23, 2019

(54) LENS MODULE

(71) Applicants: TRIPLE WIN TECHNOLOGY(SHENZHEN) CO.LTD., Shenzhen (CN); HON HAI PRECISION INDUSTRY CO., LTD., New Taipei (TW)

(72) Inventors: Sheng-Jie Ding, Guangdong (CN); Shin-Wen Chen, New Taipei (TW); Kun Li, Guangdong (CN); Jing-Wei Li, Guangdong (CN)

(73) Assignees: TRIPLE WIN TECHNOLOGY(SHENZHEN) CO. LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/853,869

(22) Filed: Dec. 25, 2017

(30) Foreign Application Priority Data

Dec. 13, 2017 (CN) .......................... 2017 1 1337672

(51) Int. Cl.
| | |
|---|---|
| *G03B 3/10* | (2006.01) |
| *G02B 7/04* | (2006.01) |
| *H04N 5/232* | (2006.01) |
| *G02B 7/10* | (2006.01) |
| *G02B 7/36* | (2006.01) |
| *G02B 7/08* | (2006.01) |

(52) U.S. Cl.
CPC ................. *G02B 7/04* (2013.01); *G03B 3/10* (2013.01); *G02B 7/08* (2013.01); *G02B 7/102* (2013.01); *G02B 7/36* (2013.01); *H04N 5/23212* (2013.01)

(58) Field of Classification Search
CPC ....................................................... G03B 3/00
USPC .......................................................... 396/133
See application file for complete search history.

(56) References Cited

U.S. PATENT DOCUMENTS

| | | | | |
|---|---|---|---|---|
| 5,754,350 A * | 5/1998 | Sato | ........................ | G02B 7/026 |
| | | | | 359/808 |
| 7,196,857 B2 * | 3/2007 | Kazama | .................. | G02B 7/006 |
| | | | | 257/E31.122 |
| 7,576,401 B1 * | 8/2009 | de Guzman | ........... | G02B 7/021 |
| | | | | 257/234 |
| 9,385,153 B2 * | 7/2016 | Luan | .................. | H01L 27/14636 |
| 9,525,002 B2 * | 12/2016 | Wong | ................. | H01L 27/14636 |
| 9,864,159 B2 * | 1/2018 | Kimura | .................. | G02B 7/025 |
| 9,876,948 B2 * | 1/2018 | Wang | ................... | H04N 5/2257 |

(Continued)

OTHER PUBLICATIONS

International Search Report, Ningbo Sunny, Camera Module and Array Module PCT/CN2016/106402 WO2017181668, Oct. 26, 2017, 3 pgs.*

*Primary Examiner* — Clayton E Laballe
*Assistant Examiner* — Kevin Butler
(74) *Attorney, Agent, or Firm* — ScienBiziP, P.C.

(57) ABSTRACT

A lens module includes a circuit, a sensor mounted on the circuit, a base mounted on the circuit, a motor mounted on the base, and a lens unit mounted on the motor. The base has a first surface, a second surface opposite to the first surface and an outer surface connected with the first surface and the second surface. The base forms a plurality of heat dissipation layers, the heat dissipation layers are made of metal materials. The heat dissipation layers are spaced from each other. The heat dissipation layers are formed on the first surface and the outer surface of the base.

12 Claims, 4 Drawing Sheets

(56) References Cited

U.S. PATENT DOCUMENTS

| | | | |
|---|---|---|---|
| 9,900,487 B2* | 2/2018 | Wang | H04N 5/2257 |
| 9,921,388 B2* | 3/2018 | Park | G02B 7/08 |
| 9,986,136 B2* | 5/2018 | Newiger | H04N 5/2252 |
| 2004/0183936 A1* | 9/2004 | Kim | G02B 7/022 |
| | | | 348/340 |
| 2005/0248684 A1* | 11/2005 | Machida | G03B 17/00 |
| | | | 348/373 |
| 2006/0140610 A1* | 6/2006 | Chang | G02B 7/021 |
| | | | 396/89 |
| 2007/0058964 A1* | 3/2007 | Shangguan | G03B 3/02 |
| | | | 396/144 |
| 2007/0126081 A1* | 6/2007 | Webster | H01L 27/14618 |
| | | | 257/565 |
| 2008/0013187 A1* | 1/2008 | Craen | G02B 3/14 |
| | | | 359/665 |
| 2008/0055752 A1* | 3/2008 | Ishizawa | G03B 3/10 |
| | | | 359/824 |
| 2008/0252771 A1* | 10/2008 | Wu | H04N 5/2254 |
| | | | 348/340 |
| 2008/0303939 A1* | 12/2008 | Hsu | H01L 27/14618 |
| | | | 348/374 |
| 2009/0033789 A1* | 2/2009 | Lin | G02B 7/02 |
| | | | 348/374 |
| 2009/0033790 A1* | 2/2009 | Lin | G02B 7/023 |
| | | | 348/374 |
| 2009/0268315 A1* | 10/2009 | Chou | G02B 7/023 |
| | | | 359/819 |
| 2010/0103540 A1* | 4/2010 | An | G02B 7/021 |
| | | | 359/819 |
| 2010/0247086 A1* | 9/2010 | Tallaron | G02B 3/14 |
| | | | 396/133 |
| 2011/0013295 A1* | 1/2011 | Chou | G02B 7/021 |
| | | | 359/819 |
| 2011/0063739 A1* | 3/2011 | Hirata | G02B 7/021 |
| | | | 359/819 |
| 2011/0090581 A1* | 4/2011 | Lee | G02B 7/022 |
| | | | 359/829 |
| 2011/0091199 A1* | 4/2011 | Lee | G03B 17/00 |
| | | | 396/533 |
| 2011/0096424 A1* | 4/2011 | Lee | G02B 7/021 |
| | | | 359/829 |
| 2011/0096425 A1* | 4/2011 | Lee | G02B 7/021 |
| | | | 359/829 |
| 2011/0097073 A1* | 4/2011 | Lee | G03B 17/00 |
| | | | 396/533 |
| 2012/0105713 A1* | 5/2012 | Luan | H04N 5/2251 |
| | | | 348/374 |
| 2012/0105983 A1* | 5/2012 | Huang | G02B 7/022 |
| | | | 359/819 |
| 2013/0258502 A1* | 10/2013 | Lai | G02B 7/021 |
| | | | 359/819 |
| 2013/0342748 A1* | 12/2013 | Ma | G02B 7/026 |
| | | | 348/335 |
| 2013/0344915 A1* | 12/2013 | Kim | G02B 7/08 |
| | | | 455/556.1 |
| 2015/0015770 A1* | 1/2015 | Baik | G03B 3/10 |
| | | | 348/345 |
| 2015/0077840 A1* | 3/2015 | Kim | G02B 7/08 |
| | | | 359/355 |
| 2015/0131272 A1* | 5/2015 | Walker | F21S 8/00 |
| | | | 362/154 |
| 2015/0138436 A1* | 5/2015 | Wong | H04N 5/2257 |
| | | | 348/374 |
| 2015/0260942 A1* | 9/2015 | Yan | G02B 7/021 |
| | | | 359/771 |
| 2015/0316745 A1* | 11/2015 | Chen | H02K 41/035 |
| | | | 359/824 |
| 2016/0320585 A1* | 11/2016 | Park | G02B 27/646 |
| 2017/0244872 A1* | 8/2017 | Wang | H04N 5/2252 |
| 2017/0245363 A1* | 8/2017 | Wang | G02B 7/09 |
| 2017/0271390 A1* | 9/2017 | Wang | H01L 27/14618 |
| 2017/0272636 A1* | 9/2017 | Wang | H04N 5/2257 |
| 2017/0280027 A1* | 9/2017 | Wang | H01L 27/14618 |
| 2017/0310861 A1* | 10/2017 | Wang | H04N 5/2254 |
| 2018/0007244 A1* | 1/2018 | Wang | H04N 5/2252 |
| 2018/0035022 A1* | 2/2018 | Wang | H04N 5/2253 |
| 2018/0035028 A1* | 2/2018 | Wang | H04N 5/2257 |
| 2018/0035029 A1* | 2/2018 | Wang | H04N 5/2257 |
| 2018/0035032 A1* | 2/2018 | Wang | B29C 43/52 |
| 2018/0048798 A1* | 2/2018 | Wang | H05K 3/284 |

* cited by examiner

LENS MODULE

CROSS-REFERENCE TO RELATED APPLICATIONS

This application claims priority to Chinese Patent Application No. 201711337672.1 filed on Dec. 13, 2017, the contents of which are incorporated by reference herein.

FIELD

The subject matter herein generally relates to a lens module.

BACKGROUND

Nowadays, with the development of the electronic device, the electronic device has configured on lens module for taking photos. Photo performance has been an important parameter of the electronic device for users.

Photo performance of the electronic device is depends on the lens module. Usually, the lens module includes a circuit assembled together with a lens unit, a motor, a sensor and a base. The lens unit, the motor, the base, the sensor, and the circuit are sealed together for preventing dust and moisture etc into the lens module. However, many of the lens unit, the base, sensor, and the circuit are made of plastic material and have bad heat dissipation. While the lens module works in a long time, the circuit may generate a lot of heat, the heat from the circuit can make the sensor, the lens unit or the base occur thermal expansion. Thus, thermal expansion of the sensor, the lens unit or the base can influence the photo performance of the lens module. Further, nowadays, the electronic devices have designed becoming more frivolous, the lens module and the electronic components (such as antenna, CPU etc.) of the electronic device have small distance. Thus, an electromagnetic interference between the lens module and the electronic components of the electronic device may be generated to make noise point on photos.

BRIEF DESCRIPTION OF THE DRAWINGS

Implementations of the present technology will now be described, by way of example only, with reference to the attached figures.

DETAILED DESCRIPTION OF EMBODIMENTS

It will be appreciated that for simplicity and clarity of illustration, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure. The description is not to be considered as limiting the scope of the embodiments described herein.

Several definitions that apply throughout this disclosure will now be presented. The term "comprising" means "including, but not necessarily limited to"; it specifically indicates open-ended inclusion or membership in a so-described combination, group, series and the like. The term "coupled" is defined as connected, whether directly or indirectly through intervening components, and is not necessarily limited to physical connections. The connection can be such that the objects are permanently connected or releasably connected.

Figure 1:
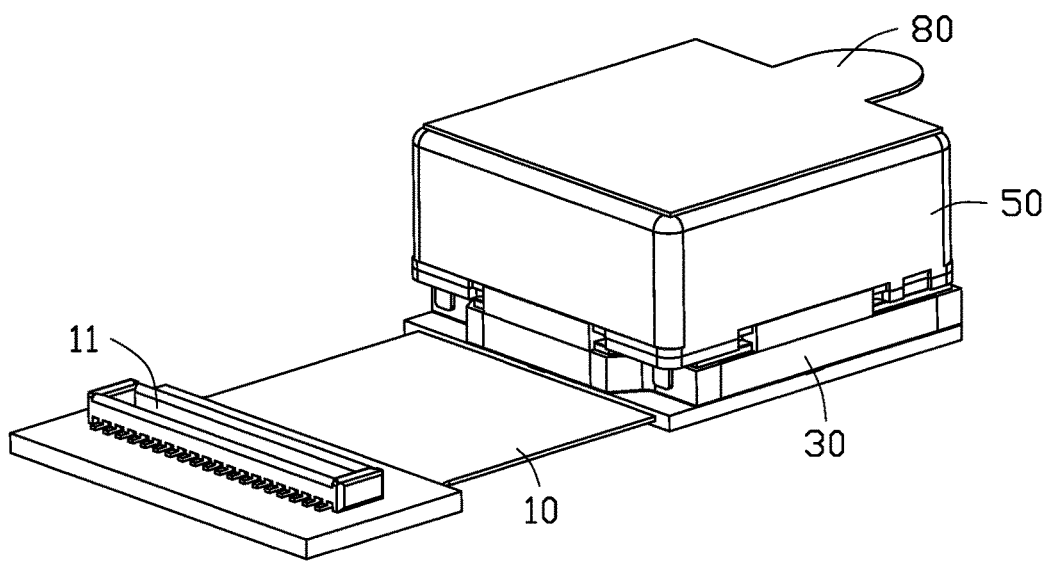
FIG. 1 is an isometric view of a lens module of the present disclosure.
Figure 2:
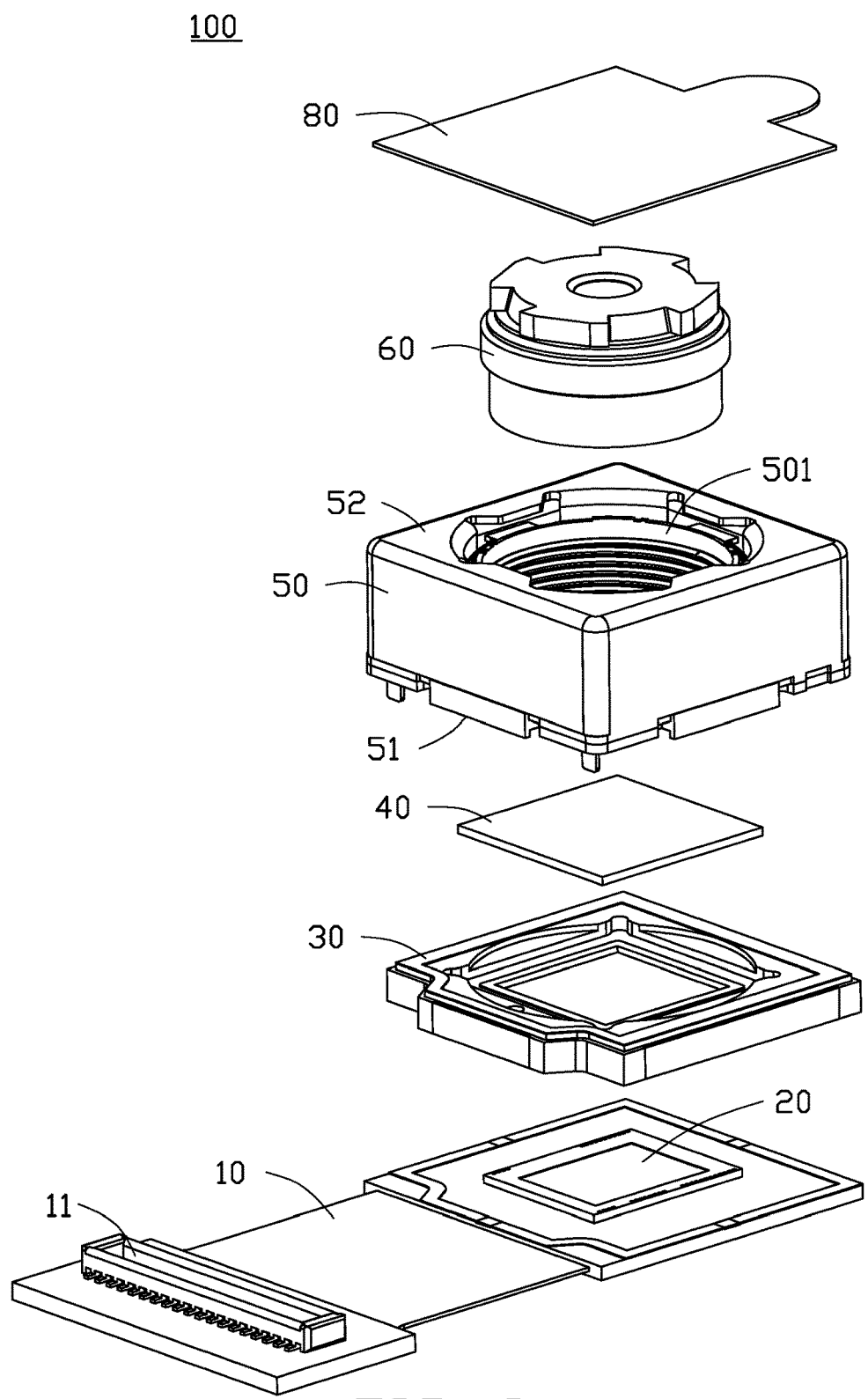
FIG. 2 is an exploded view of the lens module of FIG. 1.

Referring to FIGS. 1-2, a lens module 100 of the present disclosure includes a circuit 10, a sensor 20 mounted, a base 30, an optical filter 40, a motor 50 and a lens unit 60. The sensor 20 and the base 30 are mounted on the circuit 10. The optical filter 40, the motor 50 and the lens unit 60 are assembled on the base 30. The lens module 100 catches light through lens unit 60 and forms images on the sensor 20.

The circuit 10 can be rigid circuit board or flexible printed circuit board. The circuit 10 is used to connect with a power and control the motor, the sensor 20 to work.

The circuit 10 includes a connector 11. The connector 11 is mounted on an end of the circuit 10 and coupled with some electronic components.

The sensor 20 is made of semiconductor materials with high sensitivity. Light entered from the lens unit 60 is through the optical filter 40 and imaged on the sensor 20. The sensor 20 is mounted on an end of the circuit 10 away from the connector 11. In the exemplary embodiment, the sensor includes CCD (charge coupled device) component or CMOS (complementary metal oxide semiconductor) component.

Figure 3A:
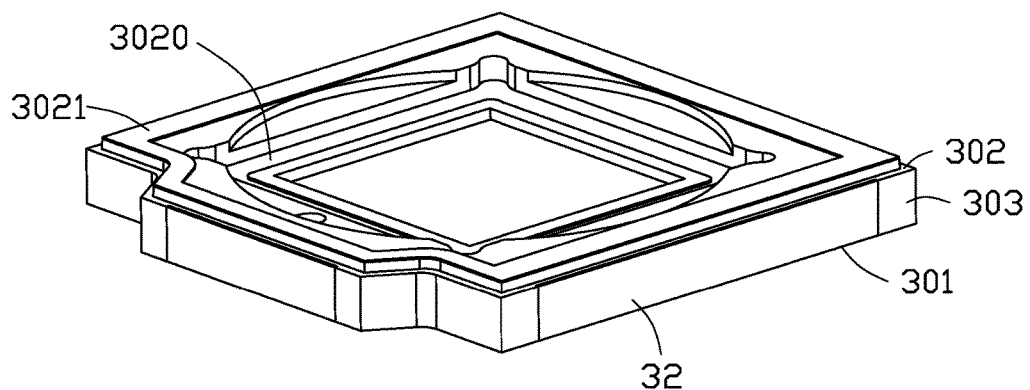
FIG. 3A is an isometric view of a base of the lens module.
Figure 3B:
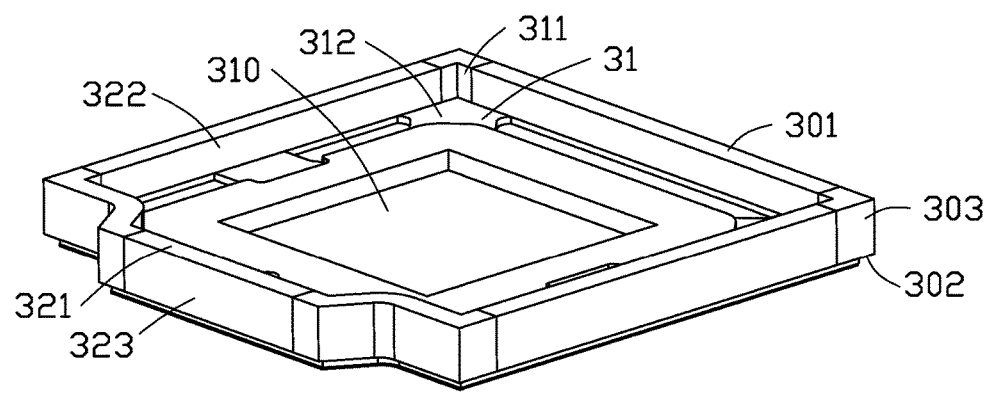
FIG. 3B is an isometric of the base of the lens module showed from another angle.
Figure 4:
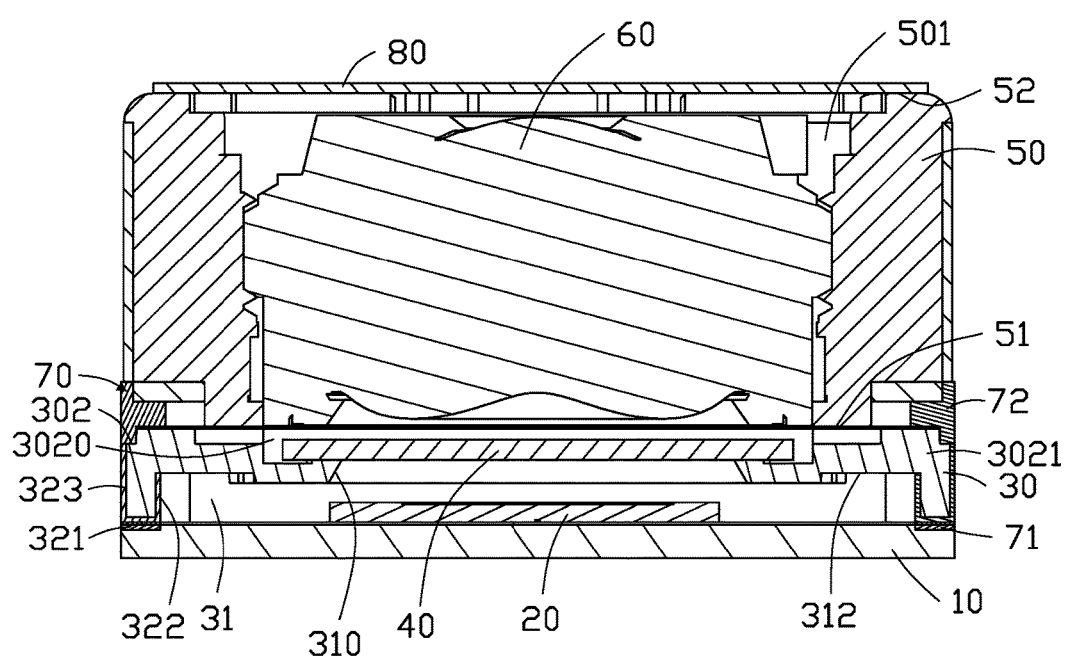
FIG. 4 is a cross-sectional view of the lens module of FIG. 1.

Also referring to FIGS. 3A-3B and FIG. 4, the base 30 is mounted on the circuit 10. The base 30 is coupled with the circuit 10 and the motor 50 with conducting resin 70. The conducting resin 70 includes a first conducting resin 71 coupled between the circuit 10 and the base 30, and a second conducting resin 72 coupled between the base 30 and the motor 50. The base 10 supports the optical filter 40 and the motor 50 thereon and received the sensor 20 therein.

Specially, the base 30 has a first surface 301, a second surface 302 opposite to the first surface 301 and an outer surface connected with the first surface 301 and the second surface 302. The base 30 also forms a sunken portion 31 concaved from the first surface 301 to the second surface 302. The sensor 20 is received in the sunken portion 31. A bottom of the sunken portion 31 forms a through hole 310 cooperated correspondingly with the lens unit 60. The base 30 also forms a cavity 3020 concaved from the second surface 302 to the first surface 301. The cavity 3020 communicates with the through 310. A diameter of the cavity 3020 is greater than a diameter of the through hole 310. The through hole 310 is used to receive the optical filter 40 therein. The base 10 also forms a connecting portion 3021. The connecting portion 3021 is formed on an outer periphery of the cavity 3020 to cooperate with the motor 50 and the lens unit 60.

Further, the base 10 also forms a plurality of heat dissipation layers 32. In the exemplary embodiment, the heat dissipation layers 32 are spaced from each other. Two non-adjacent heat dissipation layers 32 are relative each other. Each heat dissipation layer 32 includes a main portion 321, a first extending portion 322 and a second extending portion 323. The first extending portion 322 and the second extending portion 323 are respectively extended from two ends of the main portion 321 to the second surface 302 of the base 30. Specifically, the main portion 321 is formed on the first surface 301 of the base 30. The first extending portion 322 extends from an end of the main portion 321 and along an inner surface 311 of the sunken portion 31 to an bottom surface 312 of the sunken portion 31. The first extending portion 322 contacts to the inner surface 311 and the bottom surface 312 of the sunken portion 31. The second extending portion 323 extends from another end of the main portion 321 and along the outer surface 303 of the base 30 to the second surface 302 of the base 30. The first conducting resin 71 is coupled between the main portion 321 of the base 10 and the circuit 10.

In the exemplary embodiment, the base 30 is made of plastic material except for the heat dissipation layer 32. The heat dissipation layer 32 is made of metal material. The heat dissipation layer 32 is formed on the base 30 by plating.

The optical filter 40 is received in the cavity 3020 and opposite to the lens unit 60. The optical filter 40 absorbs selectively light with some wavelengths to improve an image quality of the lens module 100.

The motor 50 is assembled on the base 30 for deriving to change an focus of the lens unit 60. Generally, the motor 50 has a first end 51 and a second end 52 opposite to the first end 51. The first end 51 cooperates with the connecting portion 3021 of the base 30. The second conducting resin 72 is coupled between a periphery of the first end 51 and the second extending portion 323 of the heat dissipation layer 32. So, an static electricity generated from the motor 30 can be conducted to the circuit 10 through the heat dissipation layer 32.

Further, an center of the motor 50 forms a receiving hole 501 extended throughout the first end 51 and the second end 52. The receiving hole 501 is corresponding to the through hole 310 and receives the lens unit 60 therein.

Further, the lens unit 100 includes a protective film 80 mounted on the second end 52 of the motor 50. The protective 80 covers on the receiving hole 501 to prevent the lens unit 60 from scratch or collision.

In the lens module 100 of the present disclosure, because the base 30 forms the heat dissipation layer 32 made of metal material, and the heat dissipation layer 32 coupled with the circuit 10 and the motor 50 by the conducting resin 70, so static electricity from the motor 50 conducts to the circuit 10 through the heat dissipation layer 32. So, the static electricity can be prevented from influencing the image formed on the sensor 20. Thus, the lens unit 100 has good image quality. Also, heat generated from the motor 50 can be dissipated directly by the heat dissipation layer 32. Thus, the heat dissipation layer also can improve a heat resistance of the lens module 100. Further, the heat dissipation layer 32 also can prevent an electromagnetic radiation from electronic component from presenting noisy point. So the lens module 100 of the present disclosure has a good image quality and heat resistance.

The embodiments shown and described above are only examples. Many details are often found in the art such as the other features of an lens module. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, including in matters of shape, size and arrangement of the parts within the principles of the present disclosure up to, and including the full extent established by the broad general meaning of the terms used in the claims. It will therefore be appreciated that the embodiments described above can be modified within the scope of the claims.

What is claimed is:

1. A lens module comprising:
   a circuit;
   a sensor mounted on the circuit;
   a base mounted on the circuit, the base having a first surface, a second surface opposite to the first surface, and an outer surface connected with the first surface and the second surface;
   a motor mounted on the base; and
   a lens unit assembled on the motor;
   wherein the base forms a plurality of heat dissipation layers, the heat dissipation layers are made of metal materials, and the heat dissipation layers are spaced from each other, the heat dissipation layers are formed on the first surface and the outer surface of the base; and
   wherein two non-adjacent heat dissipation layers are relative to each other, each heat dissipation layer comprises a main portion, a first extending portion and a second extending portion, the first extending portion and the second extending portion extend from two ends of the main portion, respectively, to the second surface of the base.

2. The lens module of claim 1, wherein the lens module also comprises a conducting resin coupled with the base, the circuit and the motor, the conducting resin comprising a first conducting resin coupled between the circuit and the base, and a second conducting resin coupled between the base and the motor.

3. The lens module of claim 2, wherein the base forms a sunken portion concaved from the first surface to the second surface, the sensor is received in the sunken portion.

4. The lens module of claim 3, wherein a bottom of the sunken portion forms a through hole cooperated correspondingly with and relative to the lens unit.

5. The lens module of claim 4, wherein the main portion is formed on the first surface of the base, the first extending portion extends from an end of the main portion and along an inner surface of the sunken portion to a bottom surface of the sunken portion, the extending portion extends from another end of the main portion and along the outer surface of the base to the second surface of the base.

6. The lens module of claim 5, wherein the first extending portion contacts to the inner surface and the bottom surface of the sunken portion, the second extending portion, the first conducting resin is coupled between the main portion of the base and the circuit.

7. The lens module of claim 4, wherein the base also forms a cavity concaved from the second surface to the first surface, the cavity communicates with the through hole, a diameter of the cavity is greater than a diameter of the through hole.

8. The lens module of claim 7, wherein the lens module also comprises an optical filter, the optical is received in the cavity.

9. The lens module of claim 7, wherein the base also forms a connecting portion for cooperating with the motor and the lens unit, the connecting portion is formed on an outer periphery of the cavity.

10. The lens module of claim 9, wherein the motor has a first end and a second end opposite to the first end, the first end cooperates with the connecting portion for assembling the motor and the base, the second conducting resin is coupled between a periphery of the first end and the second extending portion of the dissipation layer.

11. The lens module of claim 10, wherein a center of the motor forms a receiving hole extended through the first end and the second end, the receiving hole is corresponding to the through hole and receives the lens unit therein.

12. The lens module of claim 11, wherein the lens module also comprises a protective film mounted on the second end of the motor, the protective covers the receiving hole.

* * * * *